United States Patent Office 3,457,241
Patented July 22, 1969

3,457,241
METHOD FOR PRODUCING VINYL CHLORIDE POLYMERS
Akihide Nakamura, Iko Ito, and Kiyohiro Kanbara, Niihama-shi, Japan, assignors to Sumitomo Chemical Company, Ltd., Osaka, Japan, a corporation of Japan
Filed Sept. 9, 1965, Ser. No. 486,096
Claims priority, application Japan, Sept. 12, 1964, 39/52,293
Int. Cl. C08f 15/24, 1/13
U.S. Cl. 260—78.5        7 Claims

ABSTRACT OF THE DISCLOSURE

When vinyl chloride or a mixture of vinyl chloride and a copolymerizable ethylenically unsaturated compound is subjected to emulsion polymerization in the presence of a polyallyl compound, the average polymerization degree of a polymer to be produced can be controlled by varying the amount of the polyallyl compound.

---

This invention relates to a method for producing vinyl chloride polymers and copolymers. More particularly, it relates to a method for regulating the average polymerization degree of polymers prepared by polymerizing vinyl chloride or a mixture of vinyl chloride and a copolymerizable ethylenically unsaturated compound employing an emulsion polymerization process.

As a method for commercially producing vinyl chloride polymers having high polymerization degree, a low temperature polymerization process in which vinyl chloride is polymerized merely at a lower temperature, or a cross-linking agent process in which vinyl chloride is copolymerized with a very small amount of a divinyl, vinyl, allyl or diallyl compound as a cross-linking agent to obtain a polymer containing branched chain and/or cross-linked molecular specimen, are well known and have been applied to suspension and bulk polymerizations.

The low temperature polymerization process, however, is required to be effected at relatively low temperatures such as below 30° C. at very slow polymerization velocity, in order to obtain polymers having an average polymerization degree of 4,000, and hence it is a commercially disadvantageous process. According to the cross-linking agent process, the polymerization is carried out at relatively high temperatures to give polymers having high polymerization degree, but various cross-linking agents which have been effective in suspension polymerization, are not necessarily effective in emulsion polymerization.

On the other hand, as a method for commercially producing vinyl chloride polymers having low polymerization degree, a high temperature polymerization process conducted by merely elevating the polymerization temperature, and a chain transfer agent process in which a chain transfer agent such as a halogenated hydrocarbon or mercaptan is used, have been known, and they are applied to both suspension and emulsion polymerizations.

The high temperature polymerization process, however, is restricted to some extent in its application due to such problems as pressure resistance of the polymerization equipment employed. Also a high temperature such as 75° C. is required in order to obtain a polymer having a polymerization degree of 200, and hence it is a commercially disadvantageous process. According to the conventional chain transfer agent process, the polymerization may be effected at relatively low temperatures to obtain polymers having low polymerization degree, but the chain transfer agent should be used in very large amounts in order to produce a polymer having a polymerization degree of about 200, and the polymerization velocity is greatly lowered. Moreover, the resulting resin suffers from such defects as a large content of volatile matter and inferior heat stability.

Figure 1:
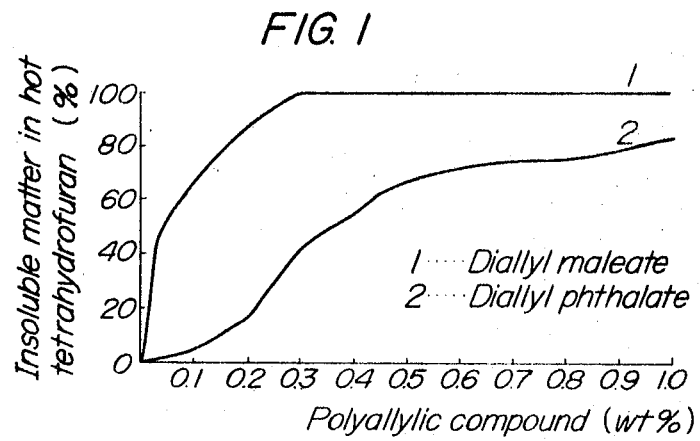

In order to overcome the said defects in the conventional processes and to optionally regulate the polymerization degree of vinyl chloride polymers, the present inventors effected various studies, and found that polyallyl compounds show specific effects in emulsion polymerization systems of vinyl chloride. In case of a suspension polymerization system of vinyl chloride, a polyallyl compound, even when added in a very small amount, acts as a strong cross-linking agent to give a polymer containing a large amount of cross-linked molecular specimen insoluble in a solvent for vinyl chloride polymers, and it is of course impossible to optionally regulate the polymerization degree of the polymer by changing the amount of the polyallyl compound added. Further, in practice, the polymer obtained is difficult to process. For example, when diallyl phthalate or diallyl maleate is added to the suspension polymerization system of vinyl chloride, there is a relationship shown in FIGURE 1 between the added amount and the weight percent of hot tetrahydrofuran insoluble matter in the resulting vinyl chloride polymer. It is clear from FIGURE 1, that, even though a very small amount of diallyl phthalate is added, a large amount of highly cross-linked molecular specimen, which is insoluble in hot tetrahydrofuran, is produced. In contrast to this, in case of the emulsion polymerization system of vinyl chloride, it is observed that either very little or no solvent insoluble matter is formed when the polymerization is conducted in the presence of a polyallyl compound, and the polymerization degree of the resulting polymer varies depending on the amount of said compound. Accordingly, it is possible to optionally regulate the average polymerization degree.

It is one object of the present invention to provide a method for producing, under commercially advantageous conditions, vinyl chloride polymers and copolymers having an average polymerization degree which may be readily controlled. Other objects will become apparent from the following description.

The objects of the present invention are attained by subjecting one member of the group consisting of vinyl chloride and a mixture of vinyl chloride with up to its own weight of copolymerizable ethylenically unsaturated compounds to emulsion polymerization in the presence of a polyallyl compound.

Suitable polyallyl compounds to be used in the present invention are those having two or more allyl groups per molecule, such as diallyl ether, diallyl sulfide, diallyl oxalate, diallyl adipate, diallyl maleate, diallyl fumarate, diallyl phthalate, trially cyanurate and traiy phosphate.

Figure 2:
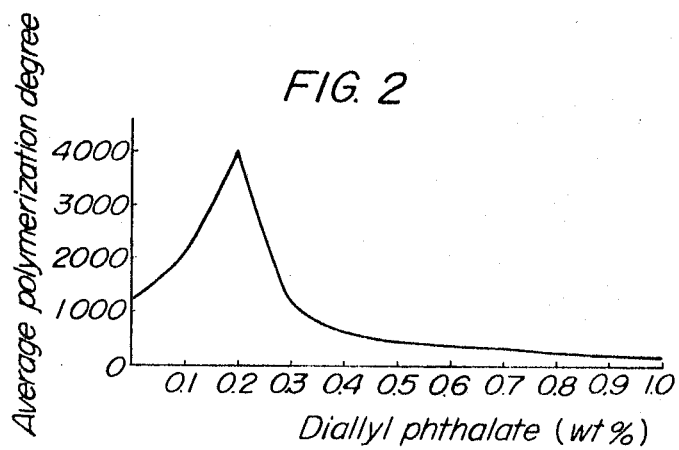

For example, when diallyl phthalate is added as a polymerization degree regulating agent to the emulsion polymerization system of vinyl chloride, there occurs a relationship as shown in FIGURE 2 between the added amount of said compound and the average polymerization degree of the resulting vinyl chloride polymer. As apparent from FIGURE 2, a suitable selection of the amount of polyallyl compound to be added makes it possible to readily produce a polymer having an average polymerization degree of from about 4000 to less than about 200. Moreover, the polymer obtained is completely soluble in solvents for vinyl chloride polymers such as tetrahydrofuran, nitrobenzene and the like, and is free from insoluble matter. The relationship between the amount of polyallyl compound to be added and the average polymerization degree of the resulting polymer varies somewhat depending upon the polyallyl compound and polymerization conditions. In any case, however, said relationship is easily ascertainable by simple preliminary polymerization tests.

In general, an amount less than 10% by weight of polyallyl compound based on the total weight of the monomers in the polymerization system gives a polymer having an average polymerization degree of from about 4000 to about 200 or less. The addition of a relatively small amount of polyallyl compound results in higher average polymerization degree than in the case when no such compound is added, while the addition of a relatively large amount of polyallyl compound results in lower average polymerization degree. However, when the amount of polyallyl compound added is more than 1.0% by weight, not only the polymerization velocity is slowed; but the further decrease in average polymerization degree caused by the addition of larger amounts of said compound becomes progressively smaller to result in economical disadvantages. Therefore, the amount of polyallyl compound to be added is preferably from 0.01 to 1.0% by weight of the monomers.

The monomers to be used in the present invention are vinyl chloride and a mixture comprising at least 50% by weight of vinyl chloride and a monomer copolymerizable with vinyl chloride. The monomers copolymerizable with vinyl chloride are ethylenically unsaturated compounds such as aliphatic acid vinyl ester, e.g. vinyl acetate, a vinylidene halide, e.g. vinylidene chloride, an alkyl acrylate, e.g. methyl or ethyl acrylate, an alkyl methacrylate, e.g. methyl methacrylate, styrene and derivatives thereof, e.g. vinyl toluene, acrylonitrile and the like.

The catalysts to be used in the present invention include known water soluble radical initiators such as hydrogen peroxide, other peroxides, potassium persulfate, etc., and redox catalyst systems comprising said initiators in combination with organic or inorganic reducing agents such as l-ascorbic acid, rongalit, ferrous and ferric sulfate, cuprous and cupric sulfate, etc. The amount of catalyst employed is usually between about 0.001 and 0.5 weight per cent based on the total monomer content.

The emulsifier to be employed in the present invention may be any of those ordinarily used in the emulsion polymerization of vinyl chloride, and is preferably an anionic surface active agent such as an alkali metal sulfate or sulfonate of alkyl, aryl or aralkyl hydrocarbon, for example, sodium lauryl sulfate and the like. The amount of emulsifier employed is usually between about 0.1 and 1.0 weight percent based on the total monomer content.

The polymerization temperature to be adopted in the present invention is within the range of from 30°–70° C., like in the ordinary vinyl chloride polymerization. The reaction time may vary between about 5 and 40 hours, depending upon the particular system and the desired polymerization degree.

The average polymerization degree referred to in the present invention is calculated as follows. 0.4 g. of a polymer is dissolved in 100 ml. of nitrobenzene, an insoluble portion if any is filtered off, the specific viscosity of the soluble portion is measured, and the said specific viscosity is introduced into the following equation:

Average polymerization degree $\bar{p} =$ $$500 \left( \text{Antilog } e \frac{[\eta]}{0.168} - 1 \right)$$

$$[\eta] : \sqrt{\frac{2}{C}} \sqrt{\eta_{sp} - \log e \, \eta_{rel}}$$

$[\eta]$: Intrinsic viscosity $\eta_{sp}$: Specific viscosity $\eta_{rel}: (\eta_{sp}+1)$ relative viscosity $C$: Concentration (g./l.) of soluble portion of the polymer The following examples illustrate the present invention, which are given merely by way of illustration and not by way of limitation.

EXAMPLE 1

4 g. of vinyl chloride, 0.1% (by weight based on the vinyl chloride monomer) of hydrogen peroxide, a molar equivalent (based on the amount of the hydrogen peroxide) of rongalit, 0.3% (by weight based on the vinyl chloride monomer) of sodium lauryl sulfate, 24 ml. of demineralized water, and amounts as set forth in Table 1 of diallyl phthalate were charged in a 50 ml. glass ampoule under a nitrogen atmosphere, and were subjected to rotating emulsion polymerization for 8 hours in a water bath maintained at 40° C. After removing unreacted vinyl chloride, the reaction product was filtered and dried under reduced pressure. The above operations were repeated while varying the amount of the diallyl phthalate as set forth in Table 1, and changing the temperature of the water bath to 50° C. The yields and average polymerization degrees of the resulting polymers were as shown in Table 1.

TABLE 1

| Amount of diallyl phthalate (weight percent to vinyl chloride) | Polymerization temperature, 40° C. | | Polymerization temperature, 50° C. | |
|---|---|---|---|---|
| | Yield (percent) | Average polymerization degree | Yield (percent) | Average polymerization degree |
| 0 | 97.1 | 1,800 | 92.5 | 1,210 |
| 0.1 | 95.0 | 4,000 | 93.5 | 2,030 |
| 0.2 | 95.6 | 2,400 | 84.3 | 3,730 |
| 0.3 | 97.8 | 960 | 89.5 | 1,210 |
| 0.4 | 97.8 | 600 | 85.7 | 700 |
| 0.5 | 93.6 | 480 | 78.0 | 520 |
| 0.6 | 93.6 | 390 | 64.5 | 400 |
| 1.0 | 90.5 | 245 | 35.8 | 220 |

From the above results, it is understood that the average polymerization degree is variable from about 4000 to about 200 by changing the amount of diallyl phthalate, and that the diallyl phthalate has a polymerization degree-regulating action. Furthermore, no nitrobenzene-insoluble portion was observed in any case.

EXAMPLE 2

In similar procedures as in Example 1, except that diallyl maleate in proportions set forth in Table 2 was added in place of the diallyl phthalate; the polymerization was conducted at 40° C. for 8 hours, and the polymerization products were subjected to after-treatment as in Example 1 to obtain polymers. The yields and average polymerization degrees of the polymers were as shown in Table 2.

TABLE 2

| Amount of diallyl-maleate (weight percent to vinyl chloride) | Yield, percent | Average polymerization degree |
|---|---|---|
| 0 | 100 | 1,850 |
| 0.01 | 100 | 2,000 |
| 0.02 | 100 | 2,310 |
| 0.03 | 99.8 | 2,920 |
| 0.04 | 100 | 3,300 |
| 0.05 | 100 | 2,750 |
| 0.06 | 100 | 2,650 |
| 0.08 | 100 | 1,780 |
| 0.1 | 100 | 1,220 |
| 0.2 | 90.0 | 930 |
| 0.3 | 95.5 | 420 |
| 0.6 | 86.0 | 260 |
| 1.0 | 86.0 | <200 |

No nitrobenzene-insoluble portion was observed in any case.

Comparative examples

For comparison with the method of the present invention shown in Examples 1 and 2, polymerization was conducted at 40° C. for 10 hours using the same starting materials and similar procedures as in Example 1, except that each of allyl methacrylate, allyl glycidyl ether and allyl acetate at proportions set forth in Table 3 was used in place of the polyallyl compound employed in each of Examples 1 and 2. The polymerization products were subjected to after-treatment as in Example 1 to obtain polymers. The yields and average polymerization degrees of the polymers were as indicated in Table 3.

TABLE 3

| Allyl compound | Amount (weight percent to vinyl chloride) | Yield (percent) | Average polymerization degree |
|---|---|---|---|
| Allyl methacrylate | 0.1 | 85.8 | 1,590 |
| Do | 0.3 | 93.8 | 1,650 |
| Do | 0.6 | 92.5 | 1,920 |
| Do | 1.0 | 92.0 | 1,280 |
| Allyl glycidyl ether | 0.1 | 90.0 | 1,500 |
| Do | 0.3 | 75.5 | 1,570 |
| Do | 0.6 | 91.0 | 1,610 |
| Do | 1.0 | 75.0 | 1,430 |
| Allyl acetate | 0.1 | 97.5 | 1,610 |
| Do | 0.3 | 95.3 | 1,620 |
| Do | 0.6 | 92.0 | 1,600 |
| Do | 1.0 | 97.5 | 1,610 |

From the above results, it will be understood that monoallyl compounds scarcely affect the polymerization degree of polymers even when the amounts of the compounds are varied and have no such polymerization degree-regulating action as seen in the case of polyallyl compounds.

Further, 4 g. of vinyl chloride, 0.2% (by weight based on the vinyl chloride monomer) of lauroyl peroxide, 0.3% (by weight based on the vinyl chloride monomer) of partially saponified polyvinyl alcohol, 24 ml. of demineralized water and an amount of either diallyl phthalate or diallyl maleate were charged in a 50 ml. glass ampoule under nitrogen atmosphere and were subjected to rotating suspension polymerization at 50° C. for 8 hours. The above operations were repeated while varying the amount of diallyl phthalate or diallyl maleate as shown in Table 4 to obtain polymers. The yields of the polymers and the amounts of hot tetrahydrofuran-insoluble matter in the polymers were as indicated in Table 4.

From the results in Table 4, listed below, it is apparent that suspension polymerization gives very large quantities of undesirable hot tetrahydrofuran-insoluble matter.

TABLE 4

| Polyallyl compound | Amount (weight percent to vinyl chloride) | Yield (percent) | The amount of hot tetrahydrofuran insoluble matter [1] |
|---|---|---|---|
| None | 0 | 45.0 | 0 |
| Diallyl phthalate | 0.1 | 43.3 | 5.0 |
| Do | 0.2 | 37.0 | 17.0 |
| Do | 0.3 | 34.0 | 41.8 |
| Do | 0.4 | 29.8 | 54.0 |
| Do | 0.5 | 26.0 | 66.2 |
| Do | 0.6 | 23.3 | 72.7 |
| Do | 0.8 | 21.5 | 77.5 |
| Do | 1.0 | 19.0 | 82.1 |
| Diallyl maleate | 0.1 | 42.3 | 66.0 |
| Do | 0.2 | 38.0 | 85.0 |
| Do | 0.3 | 36.0 | 100 |
| Do | 0.4 | 35.3 | 100 |
| Do | 0.5 | 34.3 | 100 |
| Do | 0.6 | 32.8 | 100 |
| Do | 0.8 | 30.5 | 100 |
| Do | 1.0 | 29.5 | 100 |

[1] Weight percent, based on the weight of resulting polymer, of extraction residue obtained by extracting each polymer with hot tetrahydrofuran for 24 hours by means of a Soxhlet's extractor.

EXAMPLE 3

A 5 liter autoclave was charged with 1,800 g. of demineralized water, 0.05% (by weight based on the vinyl chloride monomer) of hydrogen peroxide, 0.1 p.p.m. (based on the vinyl chloride monomer) of cupric sulfate calculated as $Cu^{++}$, ⅙ molar equivalent (based on the amount of the hydrogen peroxide) of sodium hydrogen phosphate ($Na_2HPO_4 12H_2O$), 0.3% (by weight based on the vinyl chloride monomer) of sodium dioctyl sulfosuccinate, and 0.3% (by weight based on the vinyl chloride monomer) of diallyl phthalate. The autoclave was evacuated and filled with nitrogen gas. 1200 g. of vinyl chloride was added thereto and the mixture was polymerized while stirring at 50° C. After 5 hours from the initiation of polymerization, 1/12 molar equivalent (based on the amount of the hydrogen peroxide) of sodium hydrogen phosphate was added to the polymerization system. When 9 hours of the polymerization period had elapsed, the stirring was stopped and unreacted vinyl chloride gas was removed to obtain a latex having no adhered scrum. The concentration of vinyl chloride polymer in the latex was 36.6% and the polymer had an average polymerization degree of 4060.

In similar manner as above, 1.0% (by weight based on the vinyl chloride monomer) of diallyl phthalate was used to obtain a polymer having an average polymerization degree of 200. In each case, no nitrobenzene-insoluble matter was present.

EXAMPLE 4

4 g. of a mixture comprising vinyl chloride and vinyl acetate in ratios set forth in Table 5, 0.03% (by weight based on the total weight of the monomers) of hydrogen peroxide, a molar equivalent (based on the amount of the hydrogen peroxide) of rongalit, 0.3% (by weight based on the total weight of the monomers) of sodium lauryl sulfate, 24 ml. of demineralized water, and an amount as set forth in Table 5 of diallyl phthalate were charged into a 50 ml. glass ampoule under nitrogen atmosphere, and were subjected to rotating emulsion polymerization for 8 hours in a water bath maintained at 50° C. The above operation was repeated while varying the ratio of vinyl chloride and vinyl acetate and the amount of diallyl phthalate as set forth in Table 5. The yields and average polymerization degrees of the resulting polymers were as set forth in Table 5, and no nitrobenzene-insoluble portion was observed in any case.

TABLE 5

| Vinyl acetate/vinyl chloride, weight ratio | The amount of diallyl phthalate (weight percent to monomer) | Yield (percent) | Average polymerization degree |
|---|---|---|---|
| 0/100 | 0 | 99.3 | 1,230 |
| 0/100 | 0.1 | 100 | 2,270 |
| 0/100 | 0.2 | 100 | 3,940 |
| 0/100 | 0.3 | 100 | 1,070 |
| 0/100 | 0.6 | 97.8 | 420 |
| 5/95 | 0 | 96.3 | 1,160 |
| 5/95 | 0.1 | 99.0 | 1,830 |
| 5/95 | 0.2 | 99.0 | 3,665 |
| 5/95 | 0.3 | 97.5 | 1,490 |
| 5/95 | 0.6 | 94.3 | 420 |
| 10/90 | 0 | 98.1 | 1,100 |
| 10/90 | 0.1 | 98.0 | 1,620 |
| 10/90 | 0.2 | 97.8 | 3,710 |
| 10/90 | 0.3 | 95.8 | 2,370 |
| 10/90 | 0.6 | 92.2 | 440 |
| 15/85 | 0 | 98.8 | 1,035 |
| 15/85 | 0.1 | 97.3 | 1,500 |
| 15/85 | 0.2 | 96.6 | 3,210 |
| 15/85 | 0.3 | 94.5 | 2,410 |
| 15/85 | 0.6 | 94.3 | 495 |

The present invention may be embodied in other specific forms without departing from the spirit or essential characteristics thereof. The present embodiment is therefore to be considered in all respects as illustrative and not restrictive, the scope of the invention being indicated by the appended claims rather than the foregoing description and all changes which come within the meaning and range of equivalency of the claims are therefore to be embraced therein.

What is claimed is:

1. In a method for emulsion polymerization of vinyl chloride in a presence of a catalyst, the improvement which comprises conducting the polymerization in the presence of a polyallyl compound and said catalyst being selected from the group consisting of water soluble radical initiators and redox catalyst systems comprising said initiators in combination with a reducing agent.

2. A method according to claim 1, wherein said polyallyl compound is present in a finite polymerization degree regulating amount of up to about 10 weight percent based on the total monomer content.

3. A method according to claim 1, wherein the polyallyl compound is present in the amount of about 0.01–1.0 weight percent based on the total monomer content.

4. A method according to claim 1, wherein the polyallyl compound is selected from the group consisting of diallyl maleate and diallyl phthalate.

5. A method according to claim 1, wherein the vinyl chloride is copolymerized with a finite amount up to 50 weight percent based on the total monomer content of a copolymerizable ethylenically unsaturated compound selected from the group consisting of aliphatic acid vinyl esters, vinylidene halides, alkyl acrylates, alkyl methacrylates, styrene and derivatives thereof, and acrylonitrile.

6. A method for producing vinyl chloride polymers having an average polymerization degree between about 200 and 4000, comprising emulsion polymerizing vinyl chloride at a temperature between about 30°–70° C. in the presence of between about 0.01–1.0 weight percent based on the total monomer content of at least one polyallyl compound, and regulating the amount of said polyallyl compound within the above mentioned range in accordance with the average polymerization degree desired.

7. A process according to claim 6, wherein said polyallyl compound is selected from the group consisting of diallyl ether, diallyl sulfide, diallyl oxalate, diallyl adipate, diallyl maleate, diallyl fumarate, diallyl phthalate, triallyl cyanurate, and triallyl phosphate.

References Cited
UNITED STATES PATENTS 3,230,203   1/1966   Kuhne.
3,277,064   10/1966   Lovelock et al. ___ 260—78.5 XR

OTHER REFERENCES

Williams, L.; Polymerizations in emulsion, 1956, 113–114, article taken from polymer processes, vol. X (Schildknecht).

JOSEPH L. SCHOFER, Primary Examiner

JOHN KIGHT III, Assistant Examiner

U.S. Cl. X.R.

260—85.5, 86.3, 87.1, 87.5, 92.8